United States Patent
Marchione (10) Patent No.: US 11,014,292 B2
(45) Date of Patent: May 25, 2021

(54) HYBRID METHODS OF ADDITIVE MANUFACTURING

(71) Applicant: Caterpillar Inc., Deerfield, IL (US)

(72) Inventor: Thierry Marchione, Heber City, UT (US)

(73) Assignee: Caterpillar Inc., Peoria, IL (US)

(*) Notice: Subject to any disclaimer, the term of this patent is extended or adjusted under 35 U.S.C. 154(b) by 247 days.

(21) Appl. No.: 16/132,915

(22) Filed: Sep. 17, 2018

(65) Prior Publication Data
US 2020/0086555 A1 Mar. 19, 2020

(51) Int. Cl.
*B22F 3/15* (2006.01)
*B22F 7/06* (2006.01)
*B29C 64/135* (2017.01)
*B29C 64/245* (2017.01)
*B22F 10/20* (2021.01)
(Continued)

(52) U.S. Cl.
CPC ............ *B29C 64/135* (2017.08); *B22F 10/20* (2021.01); *B28B 1/001* (2013.01); *B29C 37/006* (2013.01); *B29C 64/153* (2017.08); *B29C 64/245* (2017.08); *B29C 64/264* (2017.08); *B29C 64/268* (2017.08); *B22F 2201/20* (2013.01); *B22F 2202/01* (2013.01); *B29C 2791/006* (2013.01); *B29C 2791/008* (2013.01); *B33Y 10/00* (2014.12); *B33Y 30/00* (2014.12); *B33Y 40/00* (2014.12)

(58) Field of Classification Search
CPC .. B22F 3/1055; B22F 3/15; B22F 7/06; B22F 2201/20; B22F 2202/01; B28B 1/001; B29C 37/006; B29C 64/153; B29C 64/264; B29C 64/268; B29C 2791/006; B29C 2791/008; B33Y 10/00

USPC ... 264/69, 71, 101, 102, 113, 442, 461, 485, 264/497, 500, 510, 604, 642; 219/121.12, 219/121.35, 121.6, 121.85; 419/5, 6, 7, 419/10, 38, 42, 49, 66, 68
See application file for complete search history.

(56) References Cited

U.S. PATENT DOCUMENTS 3,581,802 A * 6/1971 Krzyzanowski ........ B22C 9/046
164/34
5,640,667 A * 6/1997 Freitag .................. B22F 3/1055
419/38 X (Continued)

FOREIGN PATENT DOCUMENTS

CN 205270740 U 6/2016
WO 2016205758 A1 12/2016

OTHER PUBLICATIONS

Das et al., "Producing Metal Parts with Selective Laser Sintering/Hot Isostatic Pressing", JOM (Dec. 1998), pp. 17-20.*

*Primary Examiner* — Leo B Tentoni
(74) *Attorney, Agent, or Firm* — von Briesen & Roper, s.c.

(57) ABSTRACT

A hybrid method of additive manufacturing is provided. The method includes providing a powder material and fusing, by a first heat source, a portion of the powder material to form a three-dimensional structure. The three-dimensional structure can define a fill region at least partially filled with the powder material. The method further includes fusing, by a second heat source, the powder material in the fill region. Fusing the powder material in the fill region can solidify the powder material in the fill region and fuse the powder material to the three-dimensional structure for forming a solid object.

18 Claims, 4 Drawing Sheets (51) Int. Cl.
  *B29C 64/153* (2017.01)
  *B29C 64/264* (2017.01)
  *B29C 64/268* (2017.01)
  *B28B 1/00* (2006.01)
  *B29C 37/00* (2006.01)
  B33Y 40/00 (2020.01)
  B33Y 10/00 (2015.01)
  B33Y 30/00 (2015.01)

(56) References Cited

U.S. PATENT DOCUMENTS

| | | | | |
|---|---|---|---|---|
| 5,997,795 | A | * | 12/1999 | Danforth ............. B29C 33/3842 |
| | | | | 264/401 |
| 9,562,632 | B1 | | 2/2017 | Billman et al. |
| 9,579,851 | B2 | | 2/2017 | Mark et al. |
| 2003/0217792 | A1 | * | 11/2003 | James .................... F01D 5/187 |
| | | | | 148/527 |
| 2015/0283614 | A1 | * | 10/2015 | Wu ....................... B22F 3/1055 |
| | | | | 419/42 |
| 2015/0360288 | A1 | | 12/2015 | Zalewski |
| 2016/0221266 | A1 | | 8/2016 | Cronin |
| 2016/0258298 | A1 | * | 9/2016 | Channel ................ B22F 3/1055 |
| 2017/0176979 | A1 | | 6/2017 | Lalish et al. |

* cited by examiner

HYBRID METHODS OF ADDITIVE MANUFACTURING

TECHNICAL FIELD

The present disclosure relates generally to additive manufacturing and, more particularly, to hybrid methods of additive manufacturing, having improved efficiencies and build rates.

BACKGROUND

Additive manufacturing techniques are used to create physical objects based on digital model data, by successively adding layers of material. Such objects may be used for various applications (e.g., engineering, prototyping, and/or the like) in various industries (e.g., automotive, aerospace, tool, robotic, medical, and/or the like).

Powder bed fusion is an additive manufacturing technique, in which a thermal energy source (e.g., a laser, electron beam, and/or the like) is used to create an object by selectively fusing regions of powder in a powder bed. The thermal energy source employed in a powder bed fusion process may have a fine diameter capable of producing complex objects having intricate features. However, the time to manufacture objects by way of existing powder bed fusion techniques can be slow, which can lead to manufacturing inefficiencies and expenses.

One attempt at reducing the time to manufacture an object produced by way of an additive manufacturing technique is disclosed in U.S. Patent Application Publication No. 2016/0221266, assigned to Braygus Technologies, LLC, (hereinafter, "the '266 publication"). Per the '266 publication, an object having a two-part infill is created. The two-part infill includes a printed infill and a fluid infill that is injected into an object's shell after the shell and printed infill have been printed.

While the method disclosed by the '266 publication addresses one method of reducing the time to manufacture an object by way of combining a printed infill with a fluid infill to create a two-part infill, a need exists for more efficient powder bed fusion processes and/or overcoming other problems in the art.

SUMMARY

According to some implementations, the present disclosure is related to a hybrid method for additive manufacturing. The method may comprise providing a powder material and fusing, by a first heat source, a portion of the powder material to form a three-dimensional structure, the three-dimensional structure defining a fill region, and the fill region being at least partially filled with the powder material. The method may further comprise fusing, by a second heat source, the powder material in the fill region to solidify the powder material in the fill region and fuse the powder material to the three-dimensional structure to form a solid object.

According to some implementations, the present disclosure is related to a further hybrid method for additive manufacturing. The method may comprise fusing, by a first heat source, a metal powder to form a three-dimensional structure, the three-dimensional structure defining a fill region and a port. The method may further comprise providing a powder material in the fill region, applying a vacuum to the port to compact the powder material in the fill region, and fusing, by a second heat source, the powder material in the fill region to solidify the powder material in the fill region and fuse the powder material to the three-dimensional structure to form a solid object.

According to some implementations, the present disclosure is related to a further hybrid method for additive manufacturing. The method may comprise providing a first powder material in a powder bed, and forming, by a first heat source, a three-dimensional structure in the powder bed, the three-dimensional structure defining a fill region. The method may further comprise removing the three-dimensional structure from the powder bed, filling the fill region with a second material, and fusing, by a second heat source, the second material in the fill region to solidify the second material in the fill region and fuse the second material to the three-dimensional structure to form a solid object.

DETAILED DESCRIPTION

Figure 1:
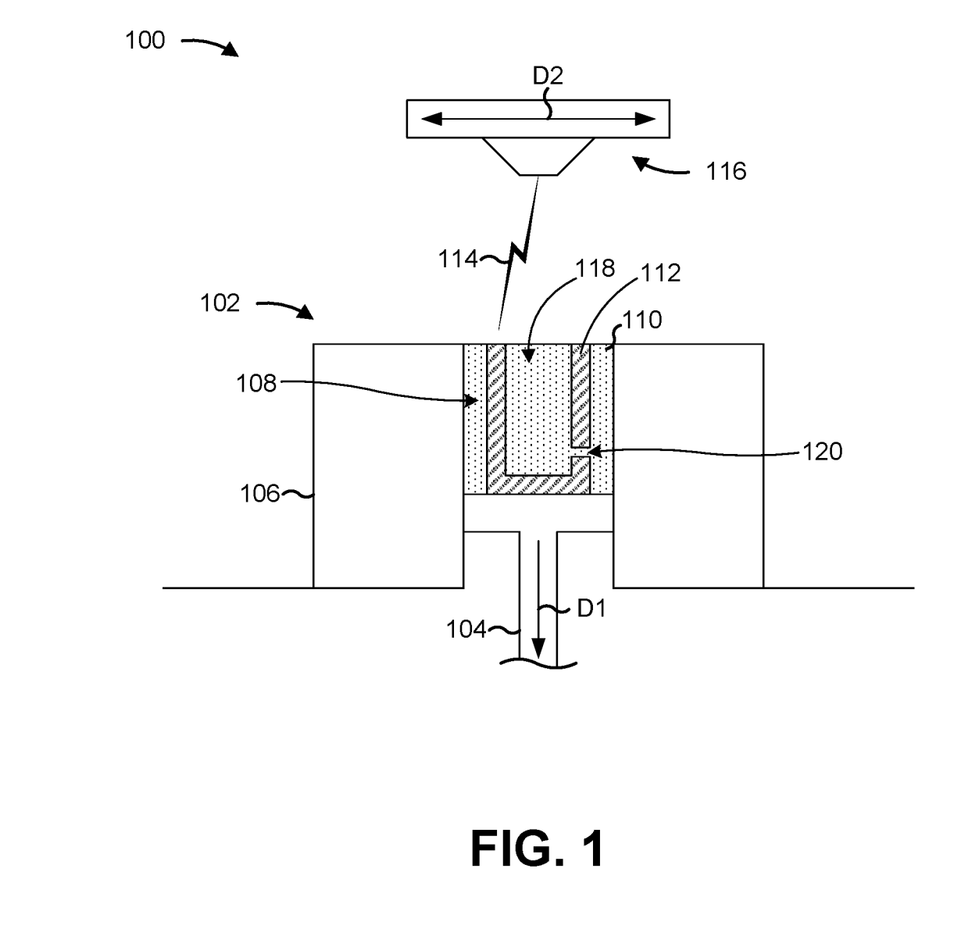
FIG. 1 is a schematic diagram of processes associated with an example implementation of a hybrid method of additive manufacturing.

FIG. 1 is a schematic diagram of processes associated with an example implementation, generally designated 100, of a hybrid method of additive manufacturing. Implementation 100 may include an example additive manufacturing system or device, generally designated 102, by which a three-dimensional structure (e.g., a shell) may be formed using an additive manufacturing process or method. In some implementations, the additive manufacturing process used to form the three-dimensional structure may include a powder bed fusion technique, although other additive manufacturing techniques are contemplated (e.g., jetting techniques, extruding techniques, laminating techniques, and/or the like).

In some implementations, additive manufacturing device 102 may include a piston 104 and a build chamber 106, which collectively define a powder bed 108 configured to contain a powder material 110, from which a three-dimensional structure 112 may be formed. Piston 104 may be configured to move or actuate in at least a first direction D1, by which successive layers of powder material 110 in powder bed 108 may be exposed and selectively heated and, thereby, selectively fused for forming three-dimensional structure 112 in powder bed 108. Three-dimensional structure 112 may include or define a hollow structure or a shell having one or more exterior walls of a desired thickness.

In some implementations, powder material 110 may comprise a glass component, a ceramic component, a polymeric component, a metal component, a plastic component, and/or a combination thereof. Such components may include, for example, particles, flakes, nanostructures, and/or the like. For example, powder material 110 may include a metal powder comprised of a single elemental species of metal particles, or a metal powder comprised of a combination of multiple elemental species of metal particles, for forming a three-dimensional structure comprised of a metal or a metal-alloy. As a specific example, powder material 110 may include a metal powder, or a metal alloy powder, comprising iron (Fe), cobalt (Co), nickel (Ni), copper (Cu), chromium (Cr), titanium (Ti), aluminum (Al), platinum (Pt), gold (Au), silver (Ag), manganese (Mn), and/or the like, and/or combination(s) thereof. Powder material 110 may include, comprise, consist, or consist essentially of any material, or combination of materials, not inconsistent with the instant disclosure.

In some implementations, three-dimensional structure 112 may form as a first heat source 114, supplied by a thermal energy system 116, selectively heats successive layers or regions of powder material 110, in powder bed 108, for fusing the successive layers or regions of powder material 110 together. First heat source 114 may include a thermal energy source, such as a laser beam or an electron beam, in some implementations. Other thermal energy sources are contemplated, and may be provided for heating and/or fusing powder material 110, consistent with the instant disclosure. In some implementations, first heat source 114 forms three-dimensional structure 112, initially, by way of an initial additive manufacturing process. As described herein, one or more subsequent heat treatments may be used to solidify material provided inside three-dimensional structure 112, for forming a solid object.

In some implementations, first heat source 114 may scan selected regions of powder material 110, based on input received from a computing system or device (not shown). For example, a computing system may instruct thermal energy system 116 to actuate or move, at least in a second direction D2, so that first heat source 114 may be positioned over and scan regions of powder material 110 in accordance with data provided by way of the computer system executing a model. In some implementations, first heat source 114 may controllably scan powder material 110 in powder bed 108 by way of a mirror-based steering system disposed in thermal energy system 116. Other methods of scanning first heat source 114 relative to powder bed 108 are contemplated.

In some implementations, powder material 110, in powder bed 108, may at least partially melt upon being scanned by first heat source 114, and, in some cases, fully melt upon being scanned by first heat source 114, to fuse (e.g., bond) with an underlying, fused layer of three-dimensional structure 112. In this way, particles of powder material 110 may fuse together to form a layer, and multiple layers may fuse together to form three-dimensional structure 112. Unfused regions of powder material 110 may physically support three-dimensional structure 112, inside powder bed 108, during formation of three-dimensional structure 112.

Although not shown, additive manufacturing device 102 may additionally include a powder delivery system (e.g., a feed supply) and a leveling roller, that may collectively supply and/or distribute successive layers of powder material 110, to powder bed 108, for selective fusing, so that three-dimensional structure 112 may be built up in a layer-by-layer powder bed fusion process.

Still referring to FIG. 1 in some implementations, three-dimensional structure 112 may comprise a hollow structure or shell that defines a fill region 118. During formation of three-dimensional structure 112, till region 118 may be at least partially filled with powder material 110, including unfused (e.g., loose) powder material 110. For example, as piston 104 moves (e.g., descends) relative to build chamber 106, powder material 110 may be provided and/or remain in fill region 118 during formation of three-dimensional structure 112. In this way, three-dimensional structure 112 may partially enclose or encase portions of powder material 110. As described further herein, powder material 110 disposed in fill region 118 may be fused by way of a second heat source, so that powder material 110 in fill region 118 may solidify, and bond to three-dimensional structure 112, thereby forming a solid object. In this way, the need to solidify powder material 110 in fill region 118 by way of scanning powder material 110 by first heat source 114 becomes obviated, which improves the build rate associated with building a solid object, and improves the ease at which a solid object may be manufactured. In some implementations, powder material 110 may be used, singly, or alone, to provide both three-dimensional structure 112 and as a powder filling in fill region 118. In this way, a solid object having a uniform structure and cross-section may be provided upon solidification of powder material 110 in fill region 118, which may be used to provide high strength objects suitable for use in various contexts (e.g., aerospace contexts, automotive contexts, construction contexts, and/or the like).

In some implementations, a vacuum port 120 may be provided in three-dimensional structure 112 during or after formation of three-dimensional structure 112. For example, first heat source 114 may apply thermal energy to a predetermined portion of powder material 110 by way of scanning powder bed 108, to solidify powder material 110 in a predetermined pattern, and, thus, form three-dimensional structure 112 in a predetermined shape. While selectively fusing some portions of powder material 110 in powder bed 108, other portions of powder material 110 in powder bed 108 may remain unfused to form vacuum port 120. Vacuum port 120 may be formed as an opening in a portion of three-dimensional structure 112, by which a vacuum connection may be established as described herein. In some implementations, powder material 110 in fill region 118 may be contained by one or more walls of three-dimensional structure 112, such that three-dimensional structure 112 may form only an outermost shell around powder material 110 in fill region 118. The outermost shell defining three-dimensional structure 112 may be devoid of internal structures built by way of an additive manufacturing process. In this way, the number of structures, surfaces, and/or layers formed by way of additive manufacturing device 102 is reduced, which improves the build rate and/or efficiency by which a solid object may be provided.

As indicated above, FIG. 1 is provided as an example. FIG. 1 schematically illustrates formation of an outer shell (e.g., three-dimensional structure 112), which may be included as a first step of a hybrid method of additive manufacturing. Other methods of creating three-dimensional structures or shells using additive manufacturing are possible and may differ from what is shown and described in connection with FIG. 1.

Figure 2:
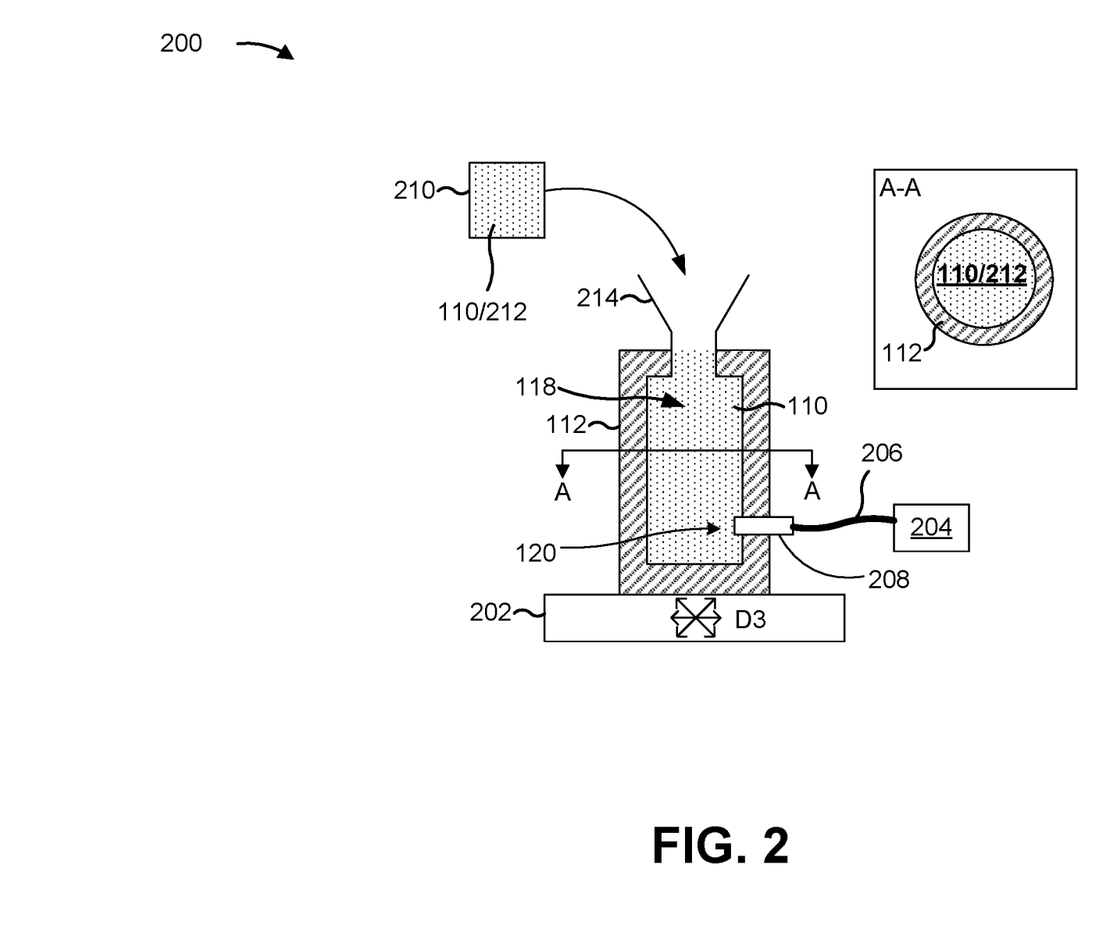
FIG. 2 is a schematic diagram of further processes associated with an example implementation of a hybrid method of additive manufacturing, which may be used in combination with the processes illustrated in FIG. 1.

FIG. 2 is a schematic diagram of further processes associated with an example implementation, generally designated 200, of a hybrid method of additive manufacturing, which may be used in combination with the processes illustrated in FIG. 1. In some implementations, the processes associated with implementation 200 may be performed after the additive manufacturing process(es) used to form three-dimensional structure 112, as described in FIG. 1.

Referring to FIG. 2, and, in some implementations, three-dimensional structure 112 may be removed from powder bed 108 and placed on a supportive structure, such as a vibrating structure 202. Vibrating structure 202 may include a shaker, a vibrating plate, and/or the like, by which powder material 110, inside fill region 118, may be caused to compact or settle relative to three-dimensional structure 112. In this way, the microstructure and/or mechanical properties associated with an object formed upon solidification of powder material 110 may improve, based on a decreased porosity of powder material 110 in fill region 118. As FIG. 2 illustrates, vibrating structure 202 may be configured to vibrate and, thus, move in multiple directions D3, as indicated by the arrows.

In some implementations, a vacuum pump 204 may be used to evacuate air from fill region 118 to further compact powder material 110 in fill region 118. Vacuum pump 204 may evacuate air from fill region 118 by way of a vacuum pressure applied by a hose or tube 206 and a vacuum head 208 partially positioned or coupled to vacuum port 120. For example, vacuum port 120 may retain vacuum head 208 so that air may be withdrawn from fill region 118 by way of a vacuum connection established between vacuum head 208, vacuum pump 204, and/or tube 206. In some implementations, vacuum head 208 may include one or more filters configured to prevent the evacuation of powder material 110 during application of a vacuum pressure by vacuum pump 204.

Still referring to FIG. 2 in some implementations, an additional amount of powder material 110 may be supplied to fill region 118 by way of a powder supply member 210 (e.g., a hopper, a drum, a container, and/or the like). Powder material 110, disposed in powder supply member 210, may be guided to fill region 118 by way of a conduit 214, such as a funnel or chute. An additional amount of powder material 110 may be added to fill region 118 after the application of vibration and/or vacuum, in some implementations, to substantially pack a maximum amount, or a near maximum amount, of powder material 110 within fill region 118. In some implementations, powder material 110 may include the powder material provided in powder bed 108 (FIG. 1) of additive manufacturing device 102 (FIG. 1). The steps of vibrating powder material 110 in fill region 118, evacuating air from fill region 118 by way of vacuum pump 204, and/or adding additional amounts of powder material 110 may be repeated multiple times, and in any order, where desired. In some implementations, powder material 110 (e.g., a same or a different powder material foiining fill region 118) may be provided by powder supply member 210 in order to provide a gradient material in a vertical direction (e.g., along a vertical axis of fill region 118) or to provide a fill region 118 formed from dissimilar materials.

Additionally, or alternatively, in some implementations, a second material 212 may be added to fill region 118 alone, or in combination with powder material 110. Second material 212 may include a powder material (e.g., where powder material 110 may include a first powder material and second material 212 may include a second powder material), a liquid material, and/or the like. In some implementations, powder material 110 may be removed (e.g., partially, or entirely) from fill region 118 of three-dimensional structure 112, for example, upon removal of three-dimensional structure 112 from powder bed 108. In some implementations, second material 212 may be provided in fill region 118, as a replacement for powder material 110. Additionally, or alternatively, second material 212 may be used in combination with powder material 110, so that fill region 118 includes a combination of powder material 110 and second material 212.

In some implementations, second material 212 includes a powder material supplied by powder supply member 210, which may be added to fill region 118 by way of conduit 214. In some implementations, second material 212 and powder material 110 may include different materials. That is, second material 212 may solidify to form a core, within the shell (i.e., three-dimensional structure 112), whereby the core and the shell are formed from different materials. In some implementations, second material 212 may include a material having a lower melting temperature than powder material 110. Stated differently, powder material 110 may include a material having a first melting temperature and second material 212 may include a material having a second melting temperature that is lower than (e.g., less than) the first melting temperature. In some implementations, second material 212 may include a liquid material provided in a liquid form, or a powder material provided in a powder form, where second material 212 comprises a glass component, a ceramic component, a polymeric component, a metal component, and/or a plastic component, and/or any combination(s) thereof. As the inset of FIG. 2 illustrates, and as taken along the view indicated by lines A-A, three-dimensional structure 112 may house or contain powder material 110, second material 212, or a combination of powder material 110 and second material 212. In some implementations, second material 212 may be vacuum evacuated and/or vibrated in fill region 118, as described above.

As indicated above, FIG. 2 is provided as an example. Other methods of establishing a material filling inside a fill region of a shell are possible and may differ from what is shown and described in connection with FIG. 2.

Figure 3:
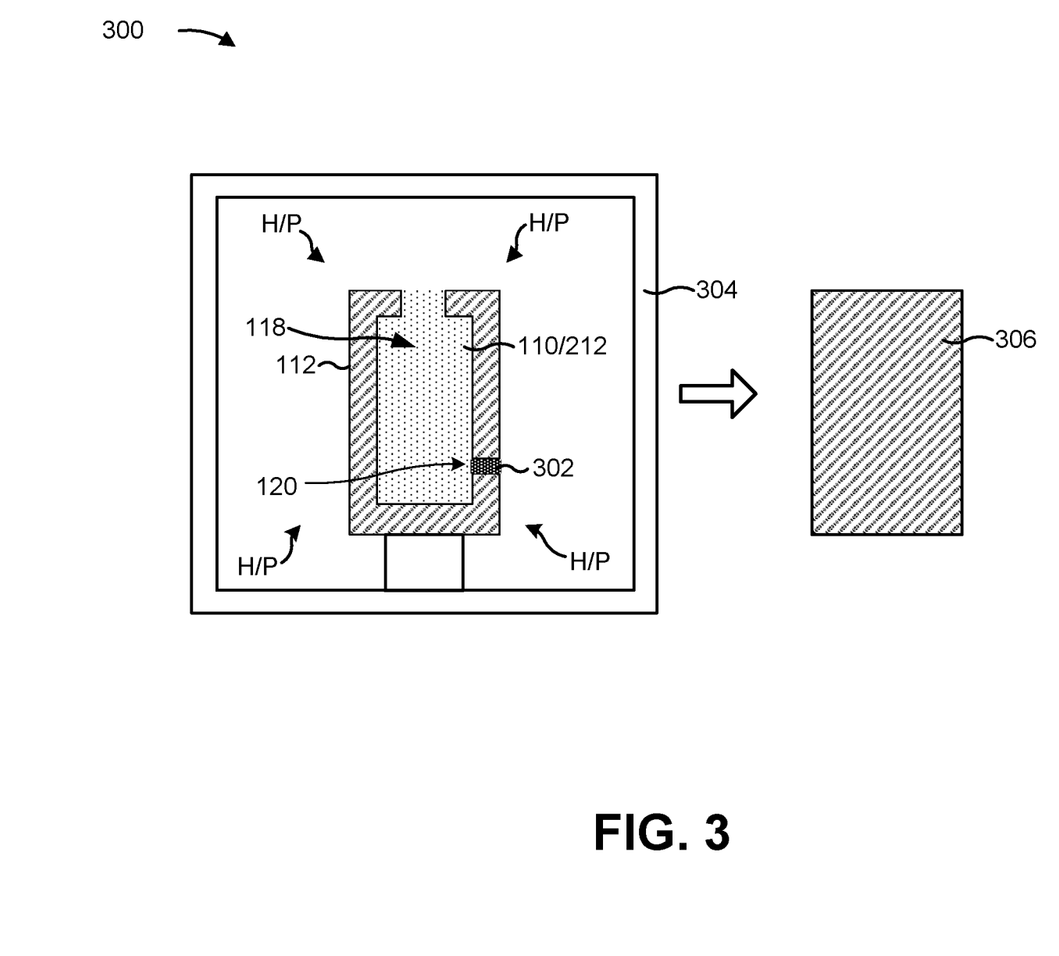
FIG. 3 is a schematic diagram of further processes associated with an example implementation of a hybrid method of additive manufacturing, which may be used in combination with the processes illustrated in FIGS. 1 and/or 2.

FIG. 3 is a schematic diagram of further processes associated with an example implementation, generally designated 300, of a hybrid method of additive manufacturing, which may be used in combination with any of the processes illustrated in FIGS. 1 and/or 2. Referring to FIG. 3, a sealing member 302 may be provided or placed in a portion of vacuum port 120 for sealing vacuum port 120 after application of the vibration and/or vacuum as described above. In some implementations, sealing member 302 may seal powder material 110 (or second material 212) inside three-dimensional structure 112. Sealing member 302 may be formed from a same material as any of three-dimensional structure 112, powder material 110, second material 212, and/or the like. Additionally, or alternatively, sealing member 302 may be formed from a different material than three-dimensional structure 112, powder material 110, second material 212, and/or the like.

In some implementations, three-dimensional structure 112, including material in fill region 118, may be provided or placed inside a second heat source 304. For example, second heat source 304 may include a furnace (e.g., a hot isostatic pressure furnace), and/or the like, configured to apply heat and/or pressure (H/P) to three-dimensional structure 112 and powder material 110 (and/or second material 212) in fill region 118. Upon application of heat and/or pressure to three-dimensional structure 112 and powder material 110 (and/or second material 212), powder material 110 (and/or second material 212) in the fill region may solidify, and fuse to three-dimensional structure 112 to form a solid object 306.

In some implementations, solid object 306 may include a single body of material, in which the shell (e.g., formed upon additive manufacture of three-dimensional structure 112) may or may not be discernable from the core (e.g., formed upon solidification of powder material 110 and/or 212 inside three-dimensional structure 112). For example, where the core and shell comprise a same material, the shell may not be physically, chemically, and/or structurally discernable from the core. Additionally, or alternatively, where the core and shell comprise different materials, the shell may be physically, chemically, and/or structurally discernable from the core.

In some implementations, solid object 306 formed by the one or more hybrid additive manufacturing processes described herein may comprise an engineering component, an automotive component, an aerospace component, an engine component, a medical component (e.g., a surgical tool, a surgical device, and/or the like), a dental component (e.g., a dental tool, a dental tray, and/or the like), a tool, a gear, a blade, a machine component, a robot component, a computer component, a component of an electrical device, and/or the like.

As indicated above, FIGS. 1-3 are provided as examples. Other examples are possible and may differ from what is shown and described in connection with FIGS. 1-3. In other words, the methods, devices, components, and/or objects and the arrangement of the devices, components, and/or objects in FIGS. 1-3 are provided for illustrative purposes only. Additionally, FIGS. 1-3 do not illustrate scale representations of the devices, components, and/or objects described herein. Rather, the various devices, components, and/or objects depicted by FIGS. 1-3 are intended to be illustrative of applications and methods in which implementations, described herein, may be employed.

Figure 4:
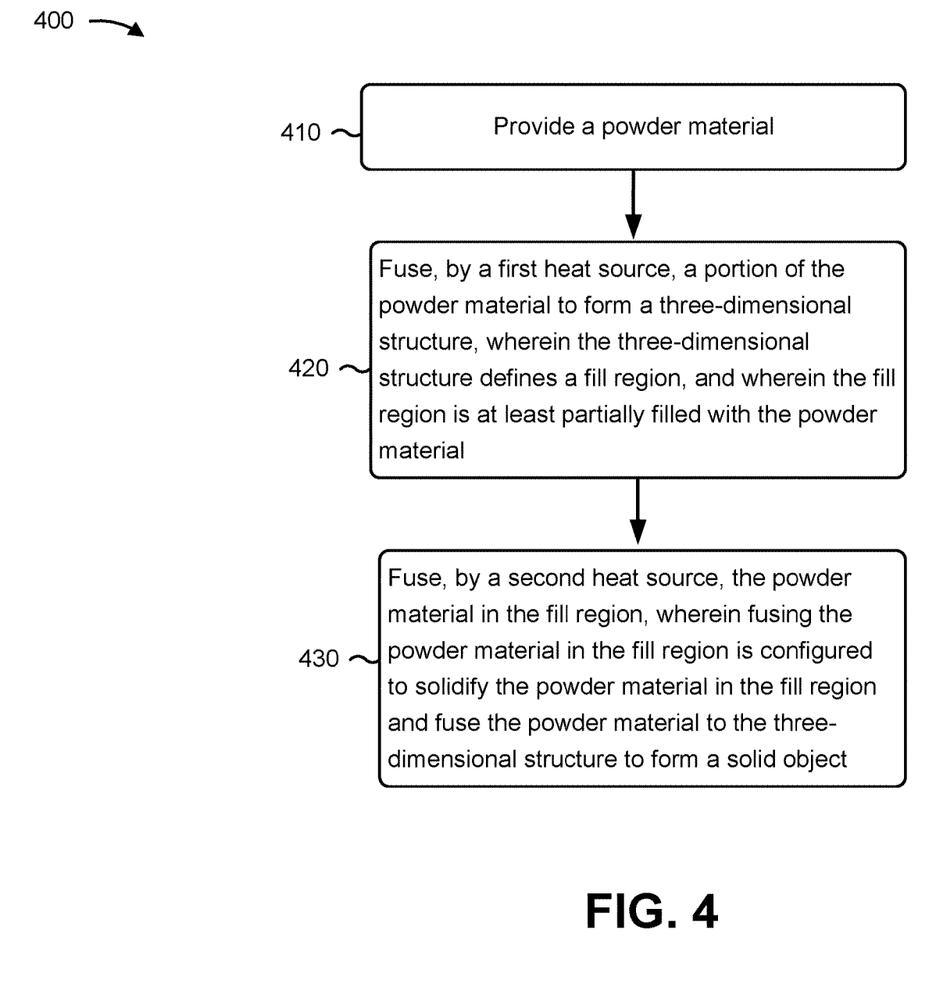
FIG. 4 is a flow chart of an example hybrid method of additive manufacturing.

FIG. 4 is a flow chart of an example process 400 for a hybrid method of additive manufacturing. In some implementations, one or more process blocks of FIG. 4 may be performed by an additive manufacturing device (e.g., additive manufacturing device 102). In some implementations, one or more process blocks of FIG. 4 may be performed by another device or group of devices separate from the additive manufacturing device, such as a vacuum (e.g., a vacuum pump 204), a vibrating device (e.g., a vibrating structure 202), a first heat source (e.g., first heat source 114), a second heat source (e.g., second heat source 304), and/or the like.

As shown in FIG. 4, process 400 may include providing a powder material (block 410). For example, the additive manufacturing device (e.g., additive manufacturing device 102) may provide the powder material in a powder bed, as described above in connection with FIGS. 1-3.

As shown in FIG. 4, process 400 may further include fusing, by a first heat source, a portion of the powder material to form a three-dimensional structure, wherein the three-dimensional structure defines a fill region, and wherein the fill region is at least partially filled with the powder material (block 420). In some implementations, the first heat source (e.g., first heat source 114) may fuse a portion of the powder material to form a three-dimensional structure, as described above in connections with FIGS. 1-3. In some implementations, the three-dimensional structure defines a fill region. In some implementations, the fill region is at least partially filled with the powder material.

As shown in FIG. 4, process 400 may further include fusing, by a second heat source, the powder material in the fill region, wherein fusing the powder material in the fill region is configured to solidify the powder material in the fill region and fuse the powder material to the three-dimensional structure to form a solid object (block 430). In some implementations, the second heat source (e.g., second heat source 304) may fuse the powder material in the fill region, as described above in connections with FIGS. 1-3. In some implementations, fusing the powder material in the fill region is configured to solidify the powder material in the fill region and fuse the powder material to the three-dimensional structure to form a solid object.

Process 400 may include additional implementations, such as any single implementation or any combination of implementations described below and/or in connection with one or more other processes described elsewhere herein.

In some implementations, process 400 includes vibrating the three-dimensional structure to compact the powder material in the fill region. In some implementations, process 400 includes defining a vacuum port in the three-dimensional structure. In some implementations, process 400 includes applying a vacuum to the vacuum port to compact the powder material in the fill region.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed example implementations (i.e., 100, 200, 300) provide a hybrid method of additive manufacturing. In operation, a three-dimensional structure 112 may be formed by way of an additive manufacture process, such as by a powder bed fusion process. The three-dimensional structure 112 may be filled with a liquid or powder material 110 and/or 212, where the liquid and/or powder material 110 and/or 112 may be solidified by way of a non-additive manufacture process, such as by heat and/or pressure applied by a furnace, to form a solid object 306. In this way, the build rate and manufacturing efficiencies associated with providing solid object 306 improves.

In some implementations, forming the three-dimensional structure by way of an additive manufacturing process reduces the amount or volume of powder material 110 (and/or second material 212) to be scanned by the first heat source 114. In this way, the time to manufacture the solid object 306 decreases. In this way, machine resources (e.g., thermal energy resources, computing resources, and/or the like) associated with scanning portions of the solid object 306 may be reduced or conserved. This, in turn, may simplify manufacture, increase throughput, improve the ease of manufacture, and/or reduce the cost of providing solid objects 306.

The foregoing disclosure provides illustration and description, but is not intended to be exhaustive, or to limit the implementations to the precise form disclosed. Modifications and variations are possible in view of the above disclosure or may be acquired from practice of the implementations. It is intended that the specification be considered as an example only, with a true scope of the disclosure being indicated by the following claims and their equivalents.

What is claimed is:

1. A method, comprising:
providing a powder material, the powder material defining a first material;
fusing, by a first heat source, a portion of the powder material to form a three-dimensional structure, the three-dimensional structure defining a fill region and a vacuum port, the fill region being at least partially filled with the powder material;
adding a second material to the fill region;
applying a vacuum to the vacuum port to compact the powder material and the second material in the fill region, the vacuum port retaining a vacuum head including a filter configured to prevent evacuation of the powder material from the fill region; and fusing, by a second heat source, the second material and the powder material in the fill region to solidify the second material and the powder material in the fill region and fuse the second material and powder material to the three-dimensional structure to form a solid object, the powder material having a first melting temperature, the second material having a second melting temperature, and the second melting temperature being lower than the first melting temperature.

2. The method of claim 1, wherein the first heat source includes a laser beam or an electron beam.

3. The method of claim 2, wherein the second heat source includes a hot isostatic pressure furnace.

4. The method of claim 1, further comprising:
vibrating the three-dimensional structure to compact the second material and the powder material in the fill region.

5. The method of claim 1, wherein the powder material comprises a metal or a metal alloy.

6. The method of claim 1, wherein the solid object comprises an engine component.

7. A method, comprising:
fusing, by a first heat source, a metal powder to form a three-dimensional structure, the three-dimensional structure defining a fill region and a port;
providing a powder material in the fill region;
applying a vacuum to the port to compact the powder material in the fill region, the port retaining a vacuum head including a filter configured to prevent evacuation of the powder material from the fill region; and
fusing, by a second heat source, the powder material in the fill region to solidify the powder material in the fill region and fuse the powder material to the three-dimensional structure to form a solid object, the metal powder having a first melting temperature, the powder material having a second melting temperature, and the second melting temperature being lower than the first melting temperature.

8. The method of claim 7, wherein the powder material and the metal powder are a same material.

9. The method of claim 7, Wherein the powder material and the metal powder are different materials.

10. The method of claim 7, wherein the powder material includes a glass component, a ceramic component, a polymeric component, a metal component, or a combination thereof.

11. The method of claim 7, wherein the first heat source includes a laser beam or an electron beam.

12. The method of claim 7, wherein the second heat source includes a hot isostatic pressure furnace.

13. A method, comprising:
providing a first powder material in a powder bed;
forming, by a first heat source, a three-dimensional structure in the powder bed, the three-dimensional structure defining a fill region and a port;
removing the three-dimensional structure from the powder bed;
filling the fill region with a second material;
applying a vacuum to the port, the port retaining a vacuum head including a filter; and
fusing, by a second heat source, the second material in the fill region to solidify the second material in the fill region and fuse the second material to the three-dimensional structure to form a solid object, the first powder material having a first melting temperature, the second material having a second melting temperature, and the second melting temperature being lower than the first melting temperature.

14. The method of claim 13; wherein the second material is in a powder form or in a liquid form.

15. The method of claim 13, wherein the first powder material includes a glass component, a ceramic component, a polymeric component, a metal component, or a combination thereof.

16. The method of claim 13, wherein the first heat source includes a laser beam or an electron beam.

17. The method of claim 1, wherein a sealing member is placed in the vacuum port to seal the powder material inside the three-dimensional structure.

18. The method of claim 13, wherein a sealing member is placed in the vacuum port to seal the second material inside the fill region.

* * * * *